United States Patent [19]
Barkley

[11] Patent Number: 6,056,219
[45] Date of Patent: May 2, 2000

[54] SELECTIVELY MOTORIZED FISHING REEL

[76] Inventor: John R. Barkley, 10349 Valley Rd., Indianapolis, Ind. 46280

[21] Appl. No.: 09/294,184

[22] Filed: Apr. 19, 1999

[51] Int. Cl.[7] .................................................. A01K 89/012
[52] U.S. Cl. ............................... 242/225; 43/21; 74/405; 74/500.5; 74/501.5 R; 74/502; 74/625; 242/263; 242/323
[58] Field of Search ..................................... 242/225, 250, 242/263, 323; 43/21; 74/405, 500.5, 501.5 R, 502, 625

[56] References Cited

U.S. PATENT DOCUMENTS

| | | | |
|---|---|---|---|
| 2,262,637 | 11/1941 | Fanshier | 43/21 |
| 2,776,515 | 1/1957 | Lynch . | |
| 3,195,829 | 7/1965 | Balaguer . | |
| 3,195,830 | 7/1965 | Balaguer . | |
| 3,248,819 | 5/1966 | Stealy . | |
| 3,348,788 | 10/1967 | Vinokur | 242/225 |
| 3,411,230 | 11/1968 | Hopper | 242/225 |
| 3,874,610 | 4/1975 | Wahlberg | 242/225 |
| 4,021,003 | 5/1977 | Watkins | 242/250 |
| 4,062,082 | 12/1977 | Azzopardi | 74/405 |
| 4,627,188 | 12/1986 | Razote | 43/21 |
| 4,887,777 | 12/1989 | Rasmussen . | |
| 5,088,657 | 2/1992 | Chen | 242/225 |
| 5,878,523 | 3/1999 | Wenzel | 242/225 |

OTHER PUBLICATIONS

Sears Craftsman Instruction Manual—Screwdrives/Versa-Pak dated Jun. '96.

*Primary Examiner*—Katherine A. Matecki
*Attorney, Agent, or Firm*—Woodard, Emhardt, Naughton, Moriarty & McNett Patent and Trademark Attorneys

[57] ABSTRACT

A fishing reel attachment for use on a rod-and-reel combination. The attachment includes an electric motor which is selectively usable to replace or assist the hand crank for the reel. The device is particularly adapted for use by an individual having the full use of only one hand.

10 Claims, 7 Drawing Sheets

SELECTIVELY MOTORIZED FISHING REEL

BACKGROUND OF THE INVENTION

The present invention relates to a fishing reel attachment particularly adapted for use by an individual having the full use of only one hand.

Certain persons, such as those who have had a stroke affecting one side of the body are not able to effectively use both of their hands even though one of their hands is fully effective. Fishing is a desirable occupation for a stroke victim because it boosts morale and self-esteem. There is a need for fishing apparatus that permits the fisherman to do all of the fishing with one hand to the extent that the fisherman wants to do so but permits the use of both hands to the extent the fisherman wants to do so or is able to do so. Various devices incorporating an electric motor for assisting in operating a fishing reel are disclosed in the prior art. The Stealy U.S. Pat. No. 3,248,819 and the Lynch U.S. Pat. No. 2,776,515 disclose devices that permits one hand operation. Other U.S. patents of interest are Balaguer U.S. Pat. No. 3,195,829 and U.S. Pat. No. 3,195,830, Chen U.S. Pat. No. 5,088,657 and Rasmussen U.S. Pat. No. 4,887,777. None of these prior art patents discloses a device that permits selective use of the electric motor or of a hand crank as determined by the desire and ability of the user. Nor do any of the disclosed devices provide for the unique adaptation of commercially available rods and reels which may enhance the user's comfort level by operating a fishing rod and reel with which he is familiar. Familiarity and comfort of use of a specific make or model may also enhance the successful rate of therapy.

SUMMARY OF THE INVENTION

One embodiment of the present invention might include a fishing reel attachment for use on a rod and reel combination. The rod and reel combination includes a hand crank for operating the reel. The attachment involves an electric motor adapted to be secured to the rod. There is also provided a gear housing adapted to be secured to the reel and interposed between the hand crank and the reel. A first bevel gear is received within the gear housing and is adapted to be fixedly connected between the hand crank and the reel whereby the reel can be driven by operating the hand crank. A second bevel gear is rotatably mounted on the gear housing and is axially movable into and out of operating engagement with the first bevel gear. A drive cable operatively couples the electric motor to the second bevel gear. There is also provided a cable housing which receives the drive cable and is fixed to the electric motor and gear housing and provides a fixed length path therebetween. There is also provided a slide button control for moving the drive cable longitudinally to move the second bevel gear into and out of operating engagement with the first bevel gear.

In another aspect the invention involves a fishing apparatus comprising a fishing rod. A fishing reel is mounted on the rod. An electric motor is mounted on the rod. There is provided a gear housing secured to the reel. A first bevel gear is received within and rotatably mounted upon the gear housing and is fixedly connected to the reel for rotation with the reel. A hand crank is fixedly connected to the first bevel gear whereby the reel can be driven by operating said hand crank. A second bevel gear is rotatably mounted on said gear housing and axially movable into and out of operating engagement with the first bevel gear. A drive cable operatively couples the electric motor to the second bevel gear. A cable housing receives the drive cable and is fixed to the electric motor and gear housing so as to provide a fixed length path therebetween. There is also provided a slide button control for moving the drive cable longitudinally to move the second bevel gear into and out of operating engagement with the first bevel gear.

DESCRIPTION OF THE PREFERRED EMBODIMENT

Figure 1:
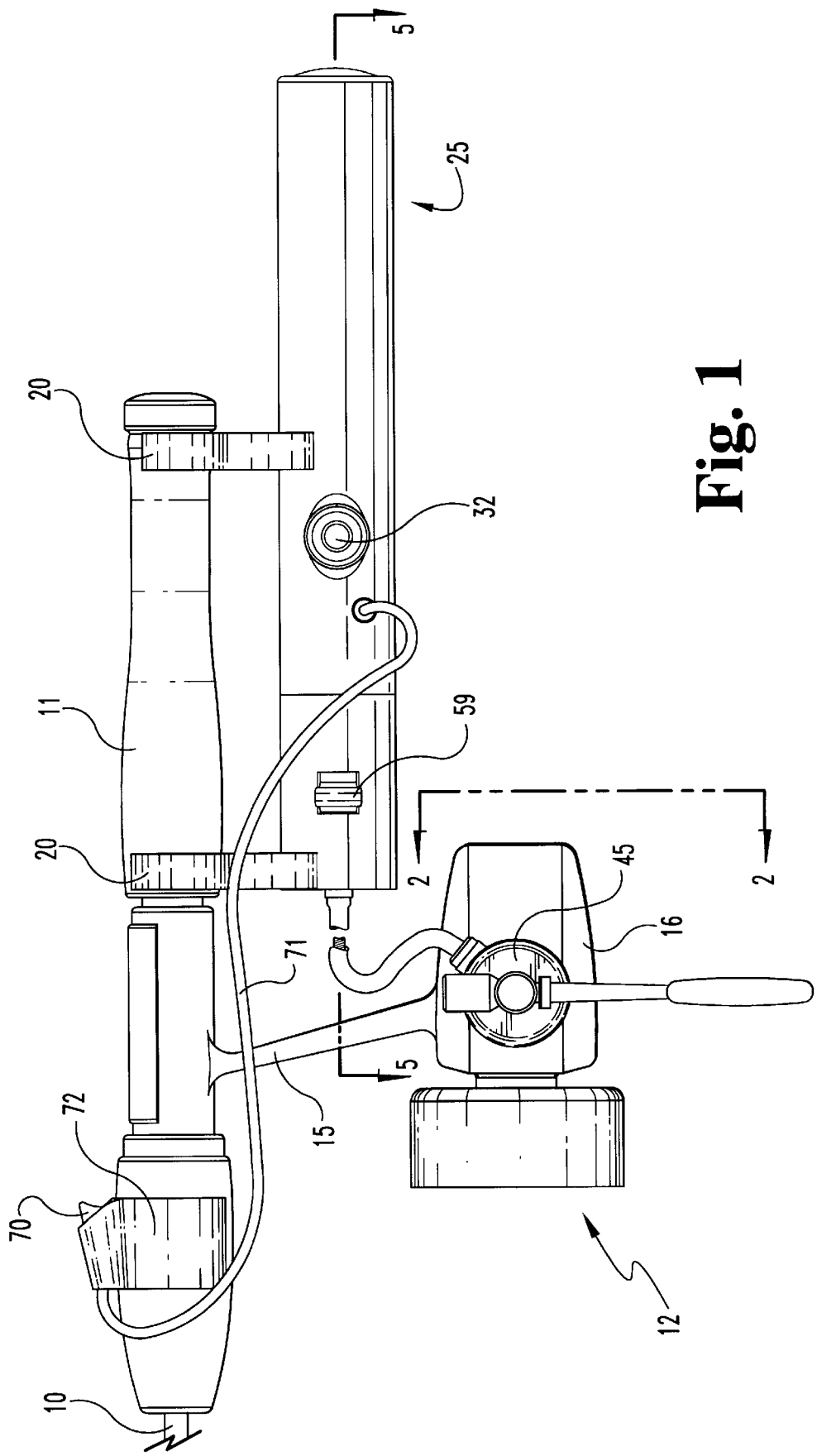
FIG. 1 is a side elevation of a conventional spinning reel and hand crank and fishing rod having the present invention mounted thereon.
Figure 2:
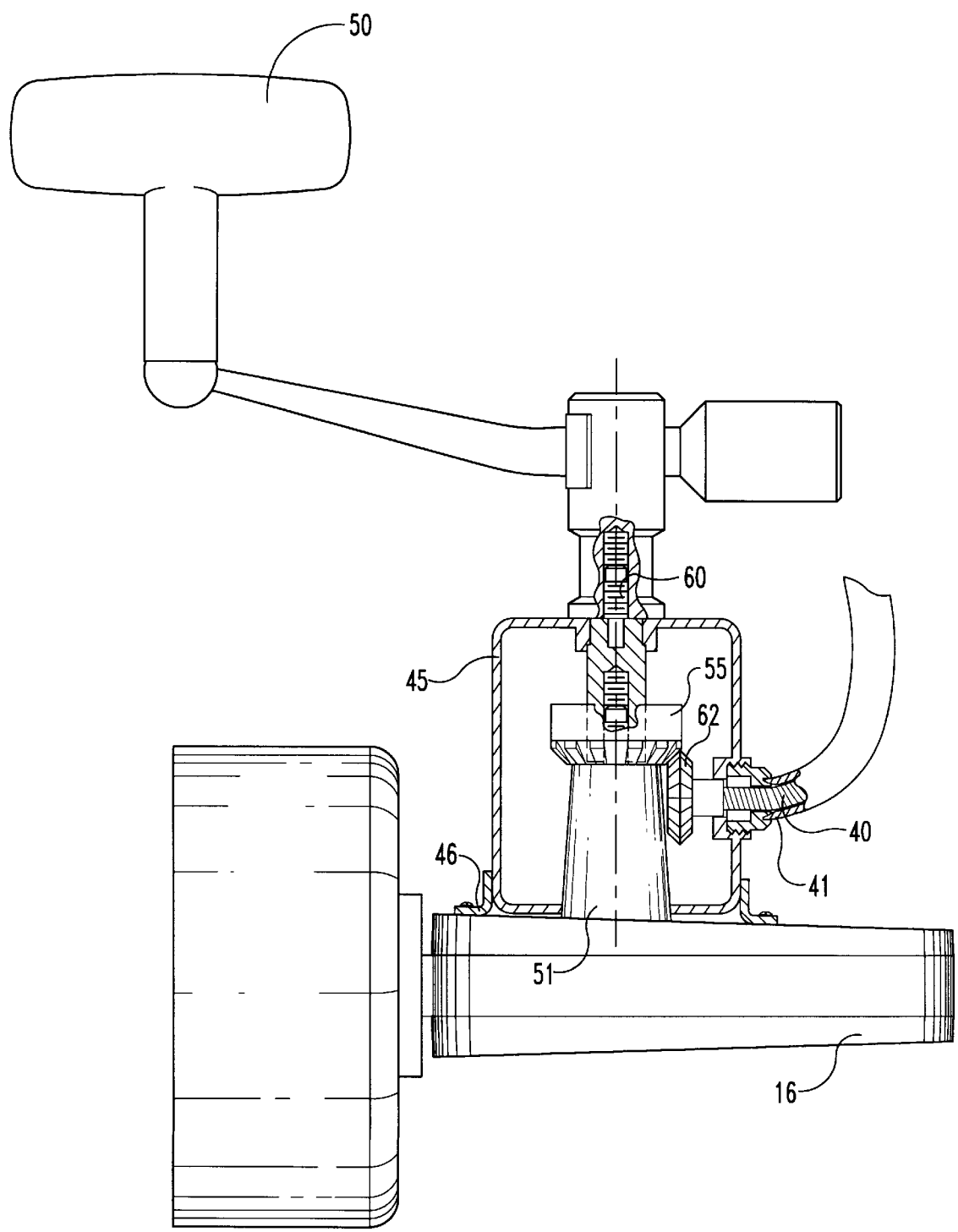
FIG. 2 is a view partially in section taken along the line 2—2 of FIG. 1 in the direction of the arrows.
Figure 3:
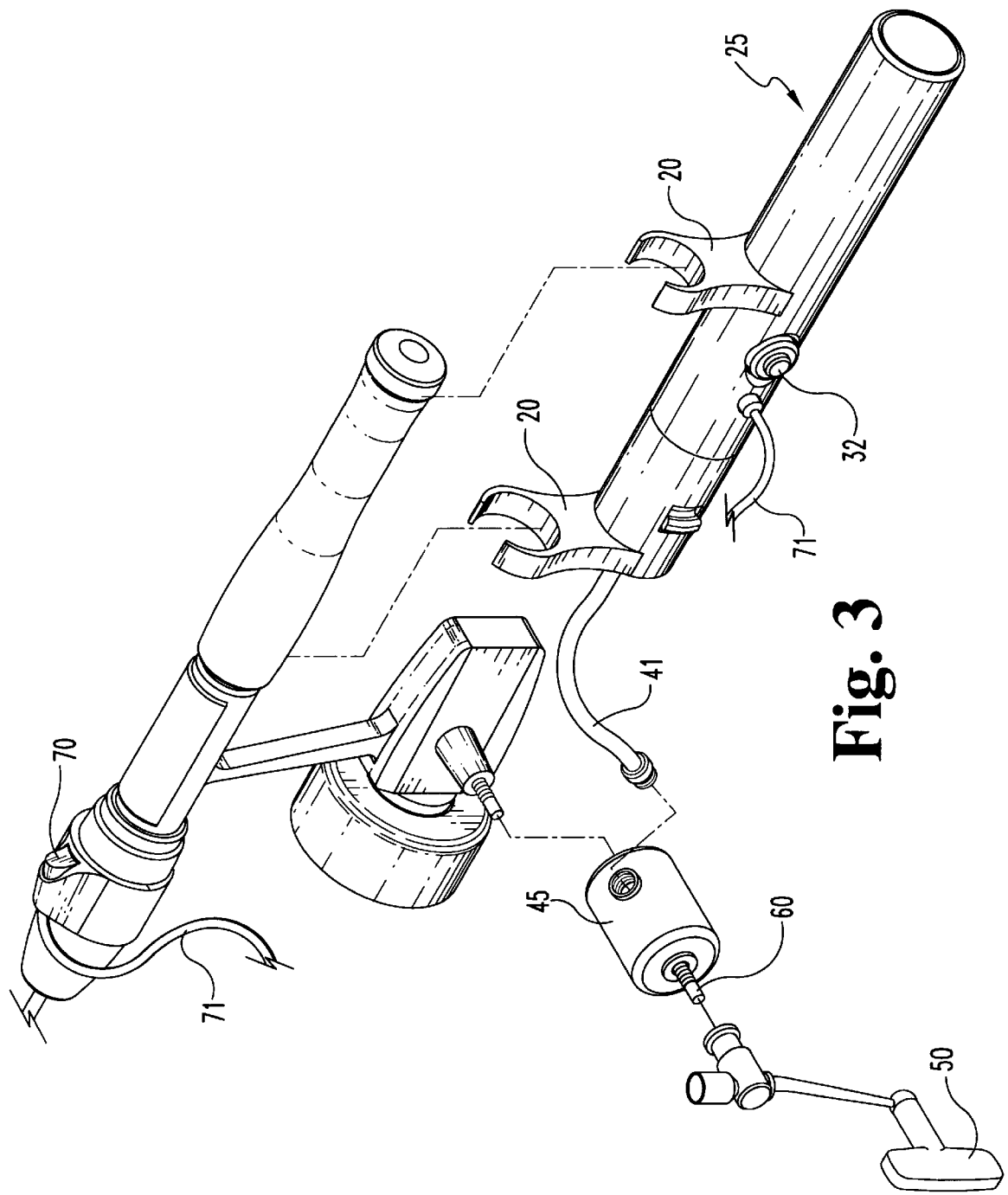
FIG. 3 is a perspective exploded view of the fishing reel attachment of the present invention showing it in relationship to a fishing rod and reel.

For the purposes of promoting an understanding of the principles of the present invention, reference will now be made to the preferred embodiments illustrated in the drawings and specific language will be used to describe same. It will nevertheless be understood that no limitation of the scope of present invention is thereby intended, such alterations and further modifications in the illustrated embodiments, and such further applications of the principles of the present invention as illustrated therein being contemplated as would normally occur to one skilled in the art to which the present invention relates.

Referring particularly to FIG. 1 there is fragmentarily illustrated a fishing rod 10 having a handle 11 and a conventional spinning reel 12 mounted thereon. The spinning reel 12 includes a connecting member 15 which secures the conventional spinning reel 12 and the housing 16 of the spinning reel 12 to the fishing rod 10. The fishing reel attachment of the present invention is mounted to the handle 11 of the fishing rod by means of clamps 20 which are fixed to an electric motor 25.

Figure 5:
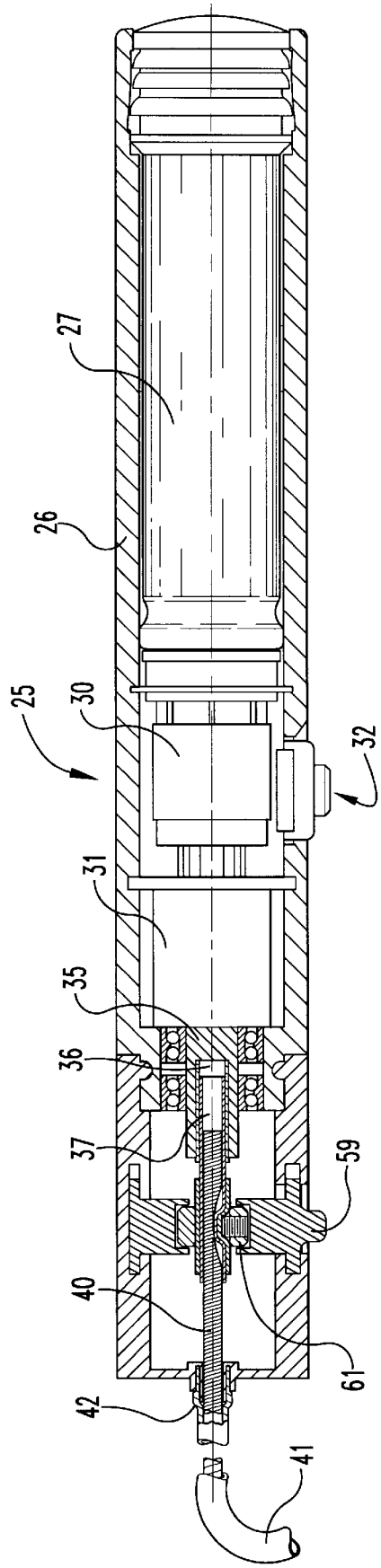
FIG. 5 is a longitudinal section through an electric motor forming a part of the present invention.

The electric motor 25 is shown in section in FIG. 5 and includes an electric motor housing 26, batteries 27, an electric motor per se 30 and reduction gearing 31. The electric motor 25 might be for example constructed similarly to the commercially available screwdrivers available from the Sears Roebuck & Co. under the Craftsman and Versa Pak trademarks Model No. 900.112620 3.6 volts DC 180 RPM. Such an electric motor carries an operating button 32 which is an on-off switch and is also a reversing switch so that it can be set to drive the motor in either of the two opposite directions.

Figure 4:
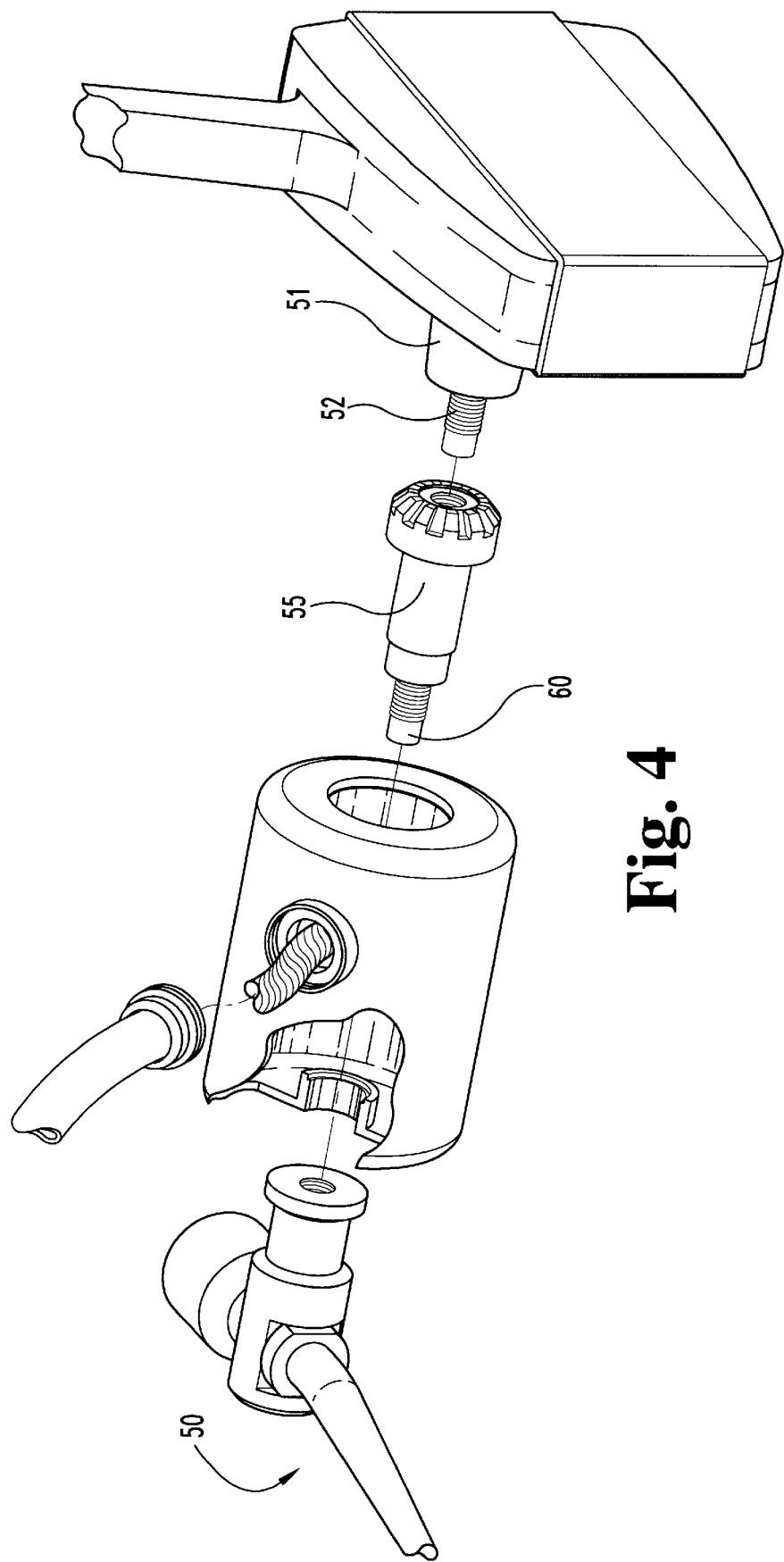
FIG. 4 is an exploded view taken from a different angle than FIG. 3.

The gearing arrangement 31 has an output shaft 35 which has a square cross section recess 36 which receives the square cross section end 37 of a drive cable 40. The drive cable 40 is received within a drive cable housing 41 that is fixedly coupled to the electric motor housing 26 at one end 42 and is fixedly coupled to a gear housing 45 at the other end of the cable housing thus providing a fixed length path between the gear housing 45 and the electric motor housing 26 for the cable 40. The gear housing 45 is fixedly mounted by angle mounts 46 to the housing 16 of the spinning reel. The spinning reel has a hand crank 50 which is normally threadedly coupled to the shaft 51 of the spinning reel. In order to use the fishing reel attachment of the present invention the hand crank 50 is detached from the threaded end 52 (FIG. 4) of the shaft 51 of the spinning reel and a first bevel gear 55 is threadedly attached to the threaded end 52 of the spinning reel. The bevel gear 55 is housed within the gear housing 45. Bevel gear 55 has integrally associated therewith a threaded projection 60 to which the hand crank 50 is threadedly connected.

Mounted upon the housing of the electric motor 25 is a slide button 59 which is coupled to the cable 40 by the member 61. Thus when the slide button 59 is moved longitudinally of the electric motor housing 26 the cable 40 is moved longitudinally causing a second bevel gear 62 mounted on the distal end of the cable 40 to move into and out of engagement with the first bevel gear 55.

It can be seen that there is provided a device that permits use by the fisherman of the electric motor 25 to power the spinning reel 12. The present arrangement also permits mounting of the device on a left handed fishing reel as well as a right handed fishing reel because the reversible switch control 32 permits movement of and driving of the reel in either direction. There is also provided a rheostat control button 70 which is coupled to the electric motor by the electrical connection line 71. Thus the speed of the electric motor and the speed of the reeling is controlled by positioning of the spring based control button 70 which is mounted upon the fishing rod by the clamp 72.

A particular advantage of the present device is that the user can use the electric motor to power the reeling action by controlling the speed of reeling with the control button 70 operated by one hand while simultaneously operating the hand crank 50 with the other hand. Thus the fisherman can go through the motion of reeling with the hand crank but is not required to exert the full force normally necessary to operate the hand crank because the electric motor provides assistance. Such operation can provide a therapeutic effect and assist the fisherman to regain use of the hand and arm. Another manner of use of the present device is to permit hand reeling when the user is fresh and to permit motorized reeling when the user is tired.

Figure 6:
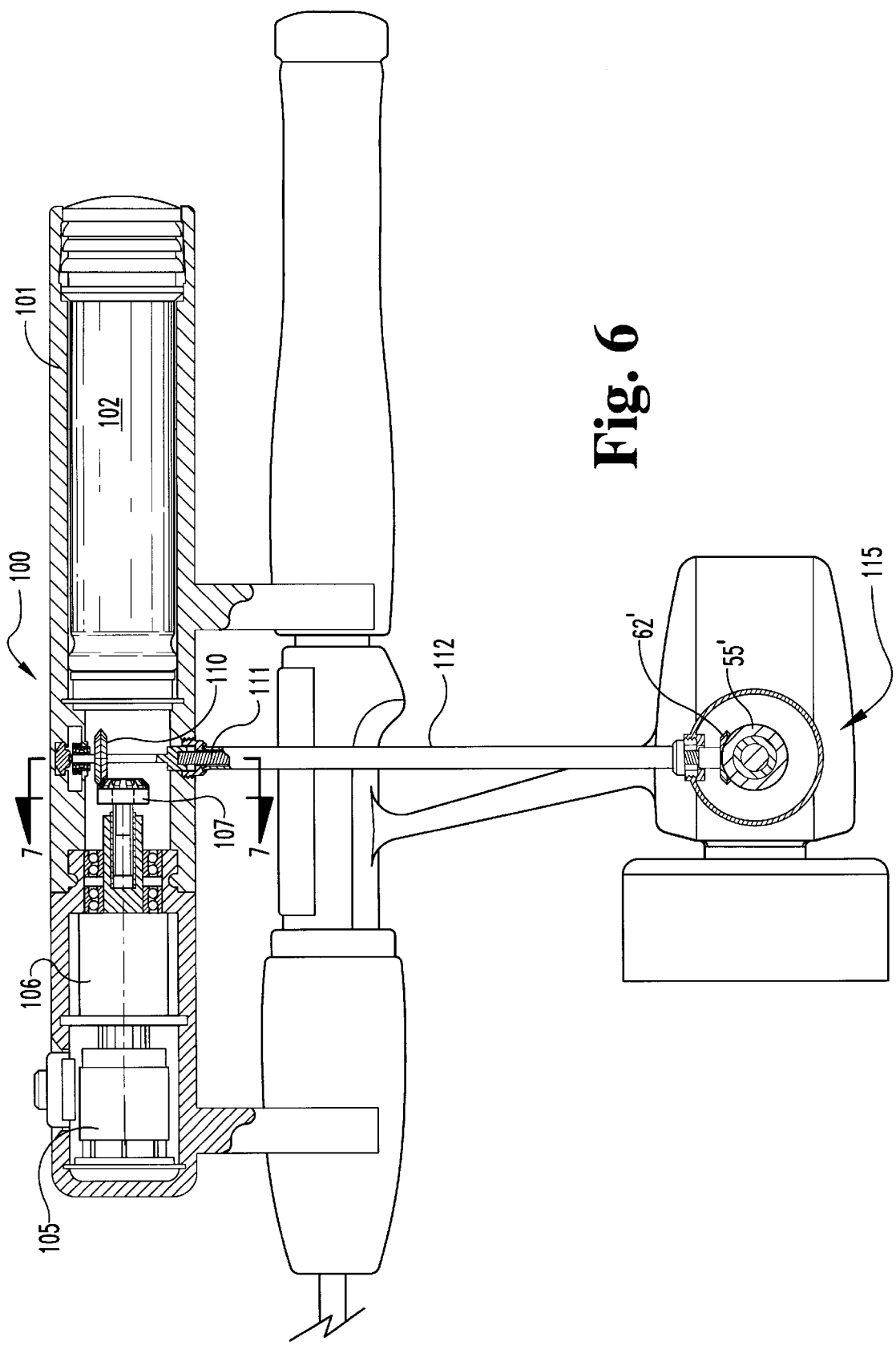
FIG. 6 is a side elevation partially in section of an alternative embodiment of the present invention.
Figure 7:
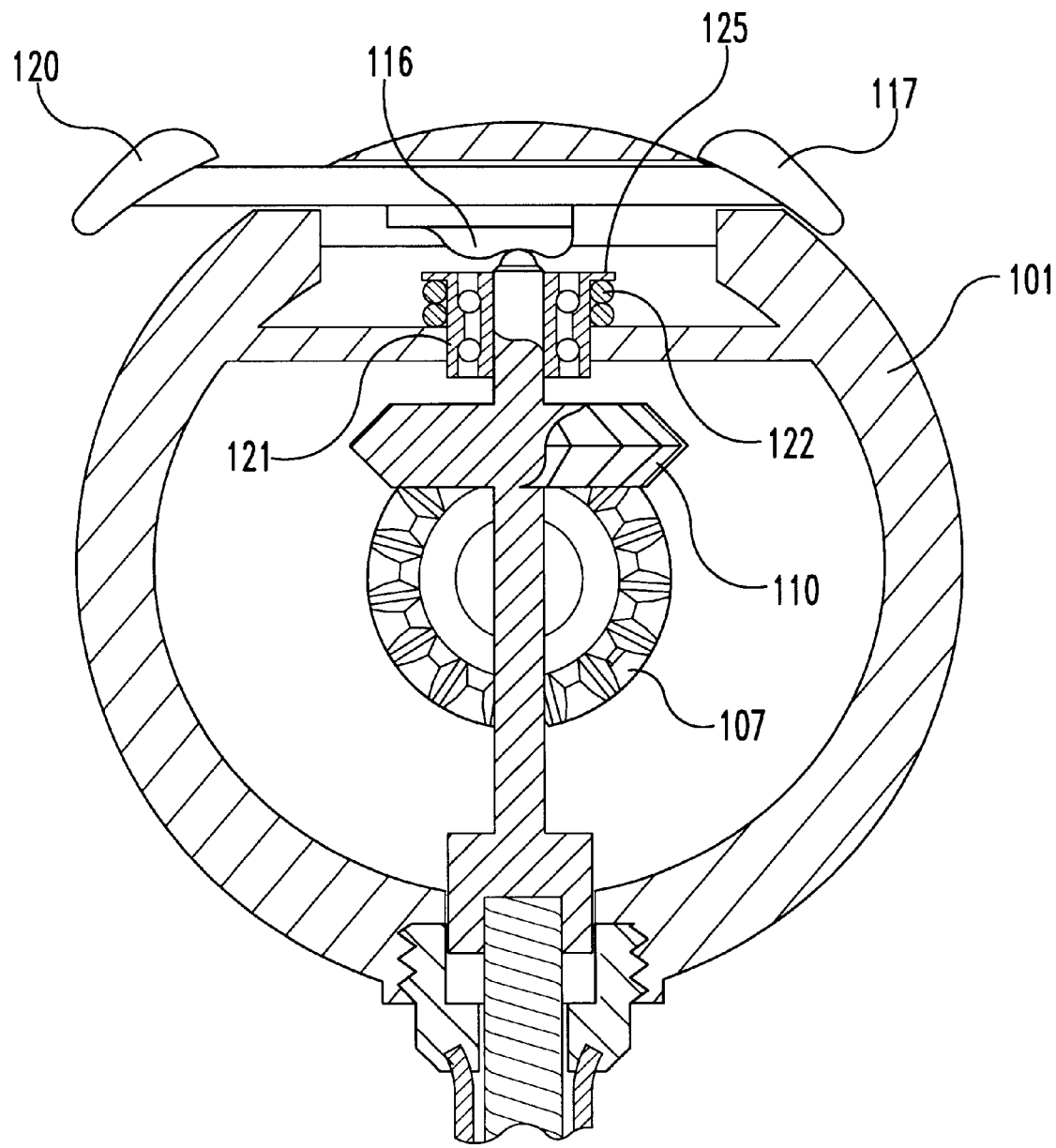
FIG. 7 is an enlarged section taken along the lines 7—7 of FIG. 6.

An alternative embodiment of the invention is shown in FIGS. 6 and 7. The embodiment of FIGS. 6 and 7 is designed to better balance the entire mechanism. Also this embodiment does not extend a substantial distance to the rear of the reel. This embodiment has an electric motor 100 that includes a motor housing 101 having therein a battery 102, a motor 105, reduction gears 106 and a pair of bevel gears 107 and 110. The bevel gear 110 is mounted on the end of drive cable 111 which is received within a cable housing 112. The cable housing 112 is similar to the cable housing 41 in that it provides a fixed length path between the gear housing 115 and the motor housing 101.

Referring to FIG. 7, the engagement and disengagement of the bevel gears 107 and 110 is controlled by a cam 116 which is moved by push buttons 117 and 120 located on opposite sides of the motor housing 101. The drive cable 111 is fixed to the bevel gear 110 which is mounted within a bearing 121 slidably mounted within the motor housing. The inner race of the bearing is fixed to the bevel gear 110. A compression spring 122 acts between the annular flange 125 of the bearing 121 and the motor housing 101 to force the bevel gear 110 out of engagement with the bevel gear 110.

In order to move the bevel gears into engagement, the button 120 or 117 is pushed to move the cam 116 against the bevel gear.

The gear housing 115 is identical to the gear housing 45 with the exception that the cable housing 112 extends directly between the motor housing and the gear housing 115. The bevel gears within the gear housing 115 are identical to the bevel gears 55 and 62 described above with the exception that they are caused to engage and disengage by push buttons 117 and 120.

The present invention is illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A fishing reel attachment for use on a rod-and-reel combination, said rod-and-reel combination including a hand crank for operating the reel, said attachment comprising an electric motor adapted to be secured to said rod, a gear housing adapted to be secured to said reel and interposed between said hand crank and said reel, a first bevel gear received within said gear housing and adapted to be fixedly connected between said hand crank and said reel whereby said reel can be driven by operating said hand crank, a second bevel gear rotatably mounted on said gear housing and axially movable into and out of operating engagement with said first bevel gear, a drive cable operatively coupling said electric motor to said second bevel gear, a cable housing receiving said cable drive and fixed to said electric motor and gear housing and providing a fixed length path therebetween, and a slide button control for moving said drive cable longitudinally to move said second bevel gear into and out of operating engagement with said first bevel gear.

2. The fishing reel attachment of claim 1 additionally comprising a speed control button adapted to be mounted on said rod, said speed control button being arranged to control the speed of said electric motor by a rheostat.

3. The fishing reel attachment of claim 2 wherein said slide button is mounted on said electric motor, said electric motor also having an on off switch and a reverse switch.

4. The fishing reel attachment of claim 3 additionally comprising a motor housing for said electric motor, a gear arrangement mounted in said motor housing and coupling said electric motor to said drive cable, and batteries for said electric motor received within said motor housing.

5. Fishing apparatus comprising:
   a fishing rod,
   a fishing reel mounted on said rod,
   an electric motor mounted on said rod,
   a gear housing secured to said reel,
   a first bevel gear received within and rotatably mounted upon said gear housing and fixedly connected to said reel for rotation with said reel,
   a hand crank fixedly connected to said first bevel gear whereby said reel can be driven by operating said hand crank,
   a second bevel gear rotatably mounted on said gear housing and axially movable into and out of operating engagement with said first bevel gear,
   a drive cable operatively coupling said electric motor to said second bevel gear, a cable housing receiving said drive cable and fixed to said electric motor and gear housing and providing a fixed length path therebetween, and a slide button control for moving said drive cable longitudinally to move said second bevel gear into and out of operating engagement with said first bevel gear.

6. The fishing apparatus of claim 5 additionally comprising:

a speed control button mounted on said rod, said speed control button being arranged to control the speed of said electric motor by a rheostat.

7. The fishing apparatus of claim 6 wherein said electric motor has a reverse switch and an on-off switch, said slide button being mounted on said electric motor.

8. The fishing apparatus of claim 7 additionally comprising:

a motor housing for said electric motor, a gear arrangement mounted in said motor housing and coupling said electric motor to said drive cable, and batteries for said electric motor received within said motor housing.

9. The fishing apparatus of claim 8 wherein said fishing rod includes;

a handle, and clamps extending from said motor housing and securing said motor housing to said handle.

10. The fishing apparatus of claim 9 wherein said electric motor is spaced alongside said rod, said rod having an axis, said electric motor extending axially of said rod but not extending axially beyond said rod.

* * * * *